United States Patent [19]
Georges

[11] 3,824,874
[45] July 23, 1974

[54] DRIVING DEVICE FOR A TUBULAR AXLE
[75] Inventor: Claude Georges, Gray, France
[73] Assignee: Societe Industrielle Du Metal Usine, Arc-les-Gray, Haute Saone, Japan
[22] Filed: May 4, 1973
[21] Appl. No.: 357,379

[30] Foreign Application Priority Data
May 18, 1972 France .............................. 72.17833

[52] U.S. Cl. ................................ 74/626, 74/665 S
[51] Int. Cl. ............................................ F16h 36/00
[58] Field of Search... 74/802, 665 D, 665 F, 665 S, 74/665 T, 626

[56] References Cited
UNITED STATES PATENTS
| 2,621,544 | 12/1952 | Ressmann | 74/626 |
| 3,088,414 | 5/1963 | Ozgur | 74/665 S |
| 3,363,480 | 1/1968 | Murphy | 74/626 |

Primary Examiner—Samuel Scott
Assistant Examiner—Wesley S. Ratliff, Jr.

[57] ABSTRACT
A driving device for a tubular axle containing an electric motor and provided with a hand drive gear wherein the electric motor and the hand drive gear engage respectively two elements of a differential gear, the cage of which is fixed to the tubular axle.

3 Claims, 1 Drawing Figure

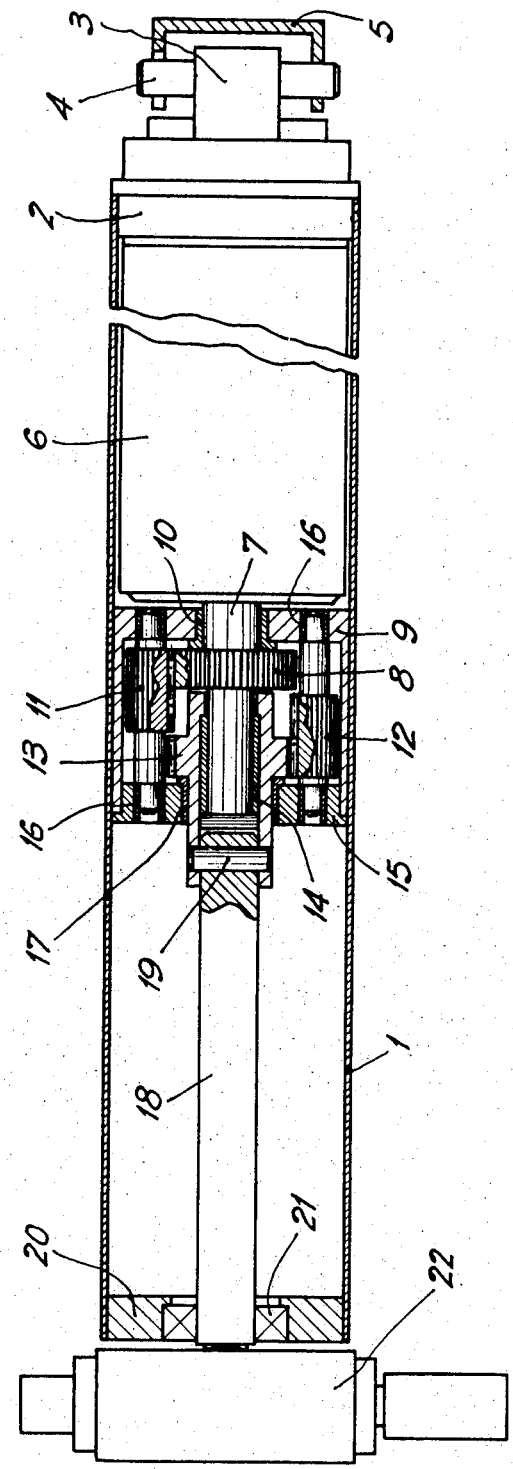

DRIVING DEVICE FOR A TUBULAR AXLE

This invention relates to tubular axles such as those on which the rolling shutters are wound.

These axles usually consist of a tube in which an electric gear motor set, usually provided with an electric brake and a torque limitator, is lodged.

In order to allow the handling of the axle, for example in case of an electric failure, a hand drive gear is provided, which is set at the end of the axle opposite to the motor. Unfortunately the man who operates the gear must overcome not only the load of the axle but also the resistances of the motor and its fittings, the latter being especially considerable as the reducing gear of the motor is driven reversibly, i.e. "going up" the speeds.

The purpose of this invention is essentially to overcome this difficulty by providing a differential gear, the cage of which is fixed to the tubular axle; the electric motor and the hand drive gear engage respectively two elements of the differential gear.

A preferred embodiment of the invention will now be described with reference to the accompanying drawing, without placing a limitation on the invention.

The FIGURE is a longitudinal section of an axle of a rolling shutter according to the invention.

The device illustrated in the FIGURE comprises a tubular axle 1 for a rolling shutter, one end of which is fitted onto a neck 3 through a rim 2 which comprises an electric end of stroke arrangement. The bearing neck 3 is locked, by means of a transversal pin 4, in an iron work 5 fixed to the main work.

The part of the axle next to the rim 2 contains a gear motor set 6 coupled with an electric brake and a torque limitator (not illustrated).

The driving shaft 7 of the motor has a sun gear 8 which is an element of a differential gear, the cage 9 of which is coaxial and fixed to the axle 1. The bottom of the cage is loosely mounted onto the shaft 7 by means of a bearing 10.

The cage contains two spider gear sets, i.e. the spider gears 11 which engage the sun gear 8 and the spider gears 12 which engage a sun gear 13, fitted loosely on the shaft 7 through a bearing 14.

The spider gears are placed in the bottom of the cage and in a cap 15 sealing the latter. They are fixed by means of bearings 16.

The axis of the sun gear 13 goes through the cap by a bearing 17. This axis is bored and engages the end of a shaft 18, coaxial with the axle 1 and fixed by means of a pin 19.

The axle 1 is provided with a flange 20 by the end where the shaft 18 goes out, said flange carrying a bearing 21 is the driving shaft of a hand drive gear 22, for example a worm gearing. This gear is irreversible, i.e. it may drive the shaft 18 but the shaft 18 may not run it.

The above described axle device is operated as follows:

When the motor is started, the sun gear 13, integral with the shaft 18 which is held by the gear 22, does not turn, and the sun gear 8 driven by the motor turns the cage 9, the spider gears 12 of which roll on the sun gear 13. The axle 1 turns with the cage.

If, in case of an electric failure for example, the gear 22 is operated, the sun gear 8 is fixed by the electric brake and the torque limitator. Then the cage 9 turns together with the sun gear 13 and the spider gears 12 roll on the sun gear 8.

The man who operates the gear 22 is not obliged to overcome the stress of the electric brake or the torque limitator. The axle 1 keeps driving the end of stroke arrangement which does not get out of order during the handling.

This invention is useful for any tubular axles, and particularly for axles of rolling shutters.

What I claim is:

1. A driving device for a tubular axle comprising in combination:
    a stationary bearing member, means for mounting said tubular axle for rotation on said bearing member;
    an electric motor provided with a brake, located within said tubular axle and secured to said bearing member, said motor having a driving shaft coaxial with said tubular axle;
    a nonreversible hand drive gear having a driving shaft mounted for rotation within said tubular axle coaxially therewith; and
    a differential gear located within said tubular axle, said differential gear having a cage secured to said tubular axle, a first sun gear in driving engagement with the driving shaft of said motor and a second sun gear in driving engagement with the driving shaft of said hand drive gear.

2. A driving device as claimed in claim 1, wherein said second sun gear is loosely mounted on said driving shaft of said motor and fitted on said driving shaft of said hand drive gear to which it is keyed.

3. A driving device according to claim 2, wherein said cage comprises a first part which is secured to said tubular axle and is loosely mounted on said driving shaft of said motor and a second part which is loosely mounted on a tubular axis of said second gear.

* * * * *